US009643256B2

(12) United States Patent
Akai et al.

(10) Patent No.: US 9,643,256 B2
(45) Date of Patent: May 9, 2017

(54) MACHINE TOOL (71) Applicant: DMG MORI SEIKI CO., LTD., Nara (JP)

(72) Inventors: Takayuki Akai, Nara (JP); Yoshihiro Matsumoto, Nara (JP); Masashi Yakoyama, Nara (JP); Toshiaki Tanaka, Nara (JP); Masao Fukumori, Nara (JP)

(73) Assignee: DMG MORI SEIKI CO., LTD., Yamatokoriyama-Shi, Nara (JP)

( * ) Notice: Subject to any disclaimer, the term of this patent is extended or adjusted under 35 U.S.C. 154(b) by 0 days.

(21) Appl. No.: 14/672,896

(22) Filed: Mar. 30, 2015

(65) Prior Publication Data
US 2015/0273587 A1    Oct. 1, 2015

(30) Foreign Application Priority Data

Mar. 31, 2014  (JP) .................................. 2014-073000
Oct. 29, 2014  (JP) .................................. 2014-220281

(51) Int. Cl.
| | |
|---|---|
| B23B 3/00 | (2006.01) |
| B23B 3/16 | (2006.01) |
| B23B 3/30 | (2006.01) |
| B23Q 39/04 | (2006.01) |
| B23Q 37/00 | (2006.01) |
| B23Q 39/00 | (2006.01) |

(52) U.S. Cl.
CPC .............. *B23B 3/161* (2013.01); *B23B 3/30* (2013.01); *B23Q 37/005* (2013.01); *B23Q 39/04* (2013.01); *B23B 2270/30* (2013.01); *B23Q 2039/004* (2013.01); *Y10T 82/2508* (2015.01)

(58) Field of Classification Search
CPC   B23B 3/16; B23B 3/161; B23B 3/164; B23B 3/167; B23B 3/30; B23B 3/32; B23Q 1/015

See application file for complete search history.

(56) References Cited

U.S. PATENT DOCUMENTS 3,241,451 A * 3/1966 Williamson ....... B23Q 3/15706
                                                              33/628
3,244,038 A * 4/1966 Lacy ........................ B23Q 5/40
                                                              74/89.39

(Continued)

FOREIGN PATENT DOCUMENTS

JP            4741351 B2    8/2011

OTHER PUBLICATIONS

English Abstract and Machine Translation for JP4741351, Publication Date: Aug. 3, 2011.

*Primary Examiner* — Will Fridie, Jr.
(74) *Attorney, Agent, or Firm* — IP Business Solutions, LLC (57) ABSTRACT

A machine tool includes a spindle equipped with a workpiece gripping portion arranged so as to face an operator side, the spindle being configured to rotatably drive a workpiece gripped by the workpiece gripping portion, and a tool mount equipped with a rotary member supporting a plurality of tools in a rotatably indexable manner about an axis parallel to an axis of the spindle. The tool mount is arranged at a tool mount installation portion formed to be positioned on the operator side in a manner such that the rotary member faces a workpiece gripping portion side.

5 Claims, 8 Drawing Sheets

(56) References Cited

U.S. PATENT DOCUMENTS

| | | | | |
|---|---|---|---|---|
| 4,393,449 | A * | 7/1983 | Takeda | G05B 19/409 318/568.1 |
| 5,163,009 | A * | 11/1992 | Yamane | B23B 3/30 29/36 |
| 5,704,262 | A * | 1/1998 | Baumbusch | B23B 3/30 82/124 |
| 6,179,692 | B1 * | 1/2001 | Hara | B23Q 11/10 451/449 |
| 6,637,302 | B2 * | 10/2003 | Miyano | B23Q 1/015 82/1.11 |
| 6,928,909 | B1 * | 8/2005 | Akimoto | B23B 3/065 29/27 C |
| 2002/0033084 | A1 * | 3/2002 | Nakaminami | B23B 3/167 82/120 |
| 2002/0134207 | A1 * | 9/2002 | Miyano | B23Q 1/015 82/1.11 |
| 2010/0154605 | A1 * | 6/2010 | Kase | B23B 25/06 82/1.11 |
| 2015/0227134 | A1 * | 8/2015 | Yanagidaira | G05B 19/409 345/173 |

* cited by examiner

MACHINE TOOL

CROSS-REFERENCE TO RELATED APPLICATIONS

The present application claims priority under 35 U.S.C. 119 to Japanese Patent Application No. 2014-073000, filed on Mar. 31, 2014 and Japanese Patent Application No. 2014-220281, filed on Oct. 29, 2014, the contents of which are incorporated herein by reference in its entirety.

BACKGROUND OF THE INVENTION

Field of the Invention

The present disclosure relates to a machine tool equipped with a spindle for rotatably driving a workpiece and a tool mount having a plurality of edged tools, and more specially relates to an improvement of an arrangement structure of the spindle and the tool mount in which dimensions of the machine tool is made more compact in the left and right direction and the up and down direction.

Description of the Related Art

The following description of related art sets forth the inventors' knowledge of related art and certain problems therein and should not be construed as an admission of knowledge in the prior art.

As a machine tool of this type, conventionally, there is known a small-scale lathe disclosed in Japanese Patent Publication No. 4741351 (hereinafter referred to as Patent Document). In the conventional lathe, the spindle is horizontally arranged and the workpiece gripping portion (chuck) is arranged so as to face the operator side, and the tool mount is arranged on the upper or lower side of the spindle, and the tools are arranged facing toward the operator side. That is, in this conventional lathe, the spindle and the tool mount are arranged on the same side so as to overlap in the up and down direction.

In the abovementioned machine tool, depending on a circumstance, etc., in a case in which a machining line is constituted by a plurality of machine tools, there is a demand to make dimensions of the machine tool more compact in the up and down direction and the left and right direction.

In the conventional small-scale lathe described in the aforementioned Patent Document, since the tool mount is arranged on the upper or lower side of the spindle so as to overlap with the spindle, there was a problem that the dimension of the machine in the up and down direction became large. Also, since the tool mount is arranged on the spindle side, there is also a problem that the replacement operation of the tool mount is difficult.

On the other hand, in a case in which the tool mount is arranged on the left side portion or the right side portion of the spindle, it is advantageous in making the dimension of the machine in the up and down direction more compact, but the demand to make the dimension of the machine more compact in the left and right direction cannot be met. Thus, the problem that the replacement operation of the tool mount is difficult remains.

The description herein of advantages and disadvantages of various features, embodiments, methods, and apparatus disclosed in other publications is in no way intended to limit the present invention. For example, certain features of the preferred described embodiments of the invention may be capable of overcoming certain disadvantages and/or providing certain advantages, such as, e.g., disadvantages and/or advantages discussed herein, while retaining some or all of the features, embodiments, methods, and apparatus disclosed therein.

SUMMARY OF THE INVENTION

The disclosed embodiments of the present invention have been developed in view of the above-mentioned and/or other problems in the related art. The disclosed embodiments of the present invention can significantly improve upon existing methods and/or apparatuses.

The embodiments of the present invention has been made in view of the conventional circumstances, and aim to provide a machine tool in which the dimensions of the machine can be made more compact in the left and right direction and up and down direction, and the replacement operation of the tool mount is easy.

In some embodiments of the present invention, a machine tool includes a spindle equipped with a workpiece gripping portion arranged so as to face an operator side and configured to rotatably drive a workpiece gripped by the workpiece gripping portion, and a tool mount equipped with a rotary member supporting a plurality of edged tools in a rotatably indexable manner about an axis parallel to an axis of the spindle. The tool mount is arranged at a tool mount installation portion formed to be positioned on the operator side in a manner such that the rotary member faces the workpiece gripping portion side.

In some embodiments of the present invention, in the machine tool as recited above, the tool mount is arranged so that an axis of the rotary member is positioned below an axis of the spindle.

In some embodiments of the present invention, in the machine tool as recited above, an indexing motor capable of indexing the rotary member to a desired angular position is arranged below a chip accommodation section for accommodating chips generated by machining a workpiece, and an output shaft of the indexing motor and a rotary shaft of the rotary member are connected via a power transmission mechanism.

According to some embodiments as recited above, since the tool mount is arranged on the tool mount installation portion positioned on the operator side in a manner such that the rotary member or the edged tool faces toward the workpiece gripping portion side of the spindle, the dimensions of the machine in the up and down direction and the left and right direction can be made compact.

Also, since the tool mount is arranged on the operator side, when removing or attaching the tool mount from or to the tool mount installation portion to repair, replace, etc., the tool mount, the tool mount unlikely interferes with the spindle and therefore the replacement operation of the tool mount can be made easily. Further, since the tool mount is positioned closer to the operator, the so-called operator's accessibility to the tool mount is excellent, and the replacement operation, etc., of the edged tools mounted on the rotary member is easy.

Further, according to some embodiments as recited above, since the tool mount is arranged so that the axis of the rotary member is positioned below the axis of the spindle, the support stiffness of the tool mount can be easily secured and the replacement operation of the tool mount can be performed more easily.

According to some embodiments as recited above, since the indexing motor is arranged below the chip accommodation section, that is, more to the processing region side than the tool mount installation portion, the indexing motor can be prevented or controlled from protruding from the tool mount installation portion to the operator side, which in turn can make the operator's accessibility to the tool mount even better and make it easier to perform the replacement operation, etc., of the edged tools.

Further, since the indexing motor is covered by the chip accommodation section from above, although it is arranged within the processing region, it can prevent chips, cutting fluid, etc., from falling onto the motor without providing a dedicated cover, etc.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims. In the drawings, the size and relative sizes of layers and regions may be exaggerated for clarity. Like numbers refer to like elements throughout. The terminology used herein is for the purpose of describing particular embodiments only and is not intended to be limiting of the invention. As used herein, the singular forms "a", "an" and "the" are intended to include the plural forms as well, unless the context clearly indicates otherwise. As used herein, the term "and/or" includes any and all combinations of one or more of the associated listed items and may be abbreviated as "/". It will be understood that, although the terms first, second, etc. may be used herein to describe various elements, these elements should not be limited by these terms. Unless indicated otherwise, these terms are only used to distinguish one element from another. For example, a first object could be termed a second object, and, similarly, a second object could be termed a first object without departing from the teachings of the disclosure. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. It will be understood that when an element is referred to as being "connected" or "coupled" to or "on" another element, it can be directly connected or coupled to or on the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.). However, the term "contact," as used herein refers to direct contact (i.e., touching) unless the context indicates otherwise. Terms such as "same," "planar," or "coplanar," as used herein when referring to orientation, layout, location, shapes, sizes, amounts, or other measures do not necessarily mean an exactly identical orientation, layout, location, shape, size, amount, or other measure, but are intended to encompass nearly identical orientation, layout, location, shapes, sizes, amounts, or other measures within acceptable variations that may occur, for example, due to manufacturing processes. The term "substantially" may be used herein to reflect this meaning. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

BRIEF DESCRIPTION OF THE DRAWINGS

The disclosed embodiments of the present invention are shown by way of example, and not limitation, in the accompanying figures.

DETAILED DESCRIPTION

In the following paragraphs, some embodiments of the invention will be described by way of example and not limitation. It should be understood based on this disclosure that various other modifications can be made by those in the art based on these illustrated embodiments.

Hereinafter, embodiments of the present invention will be explained with reference to the attached drawings.

Embodiment 1

FIGS. 1 to 4 are drawings for explaining a lathe according to Embodiment 1 of the present invention. Further, in this embodiment, "front and back" respectively refers to a closer side and a farther side when seen from an operator M positioned at the front side of the machine, and "left and right" respectively refer to the left and the right side when seen from the operator M.

Figure 1:
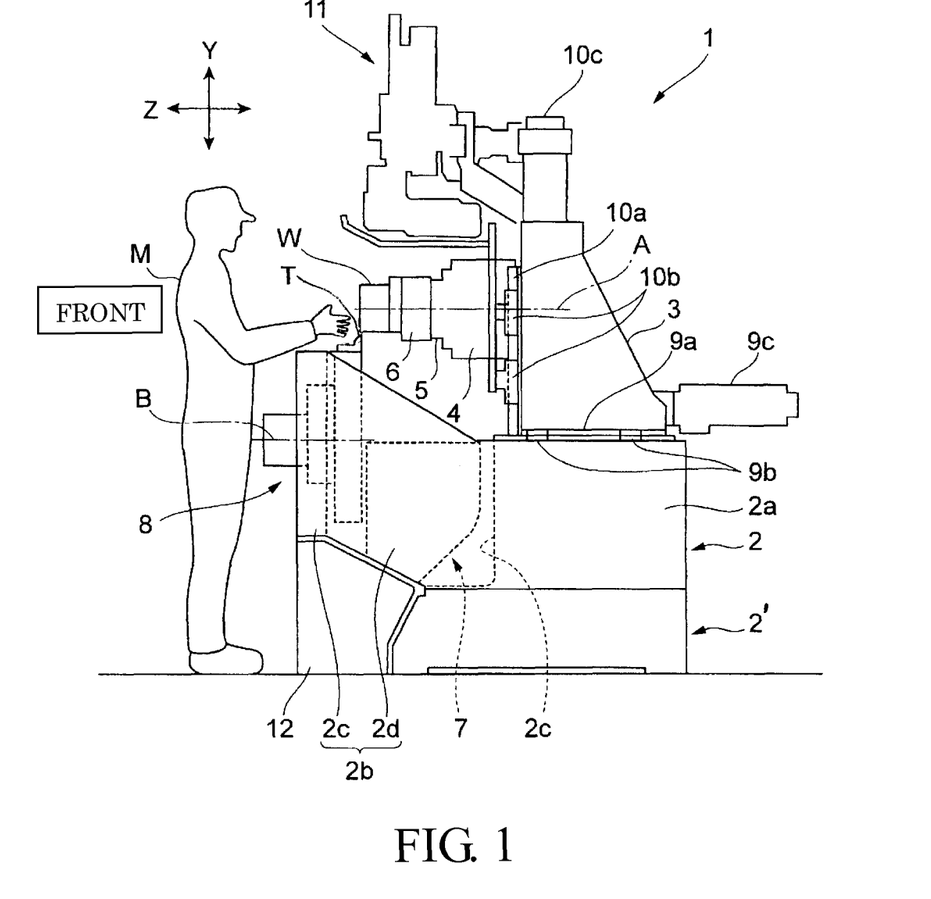
FIG. 1 is a side view of a lathe according to Embodiment 1 of the present invention.
Figure 2:
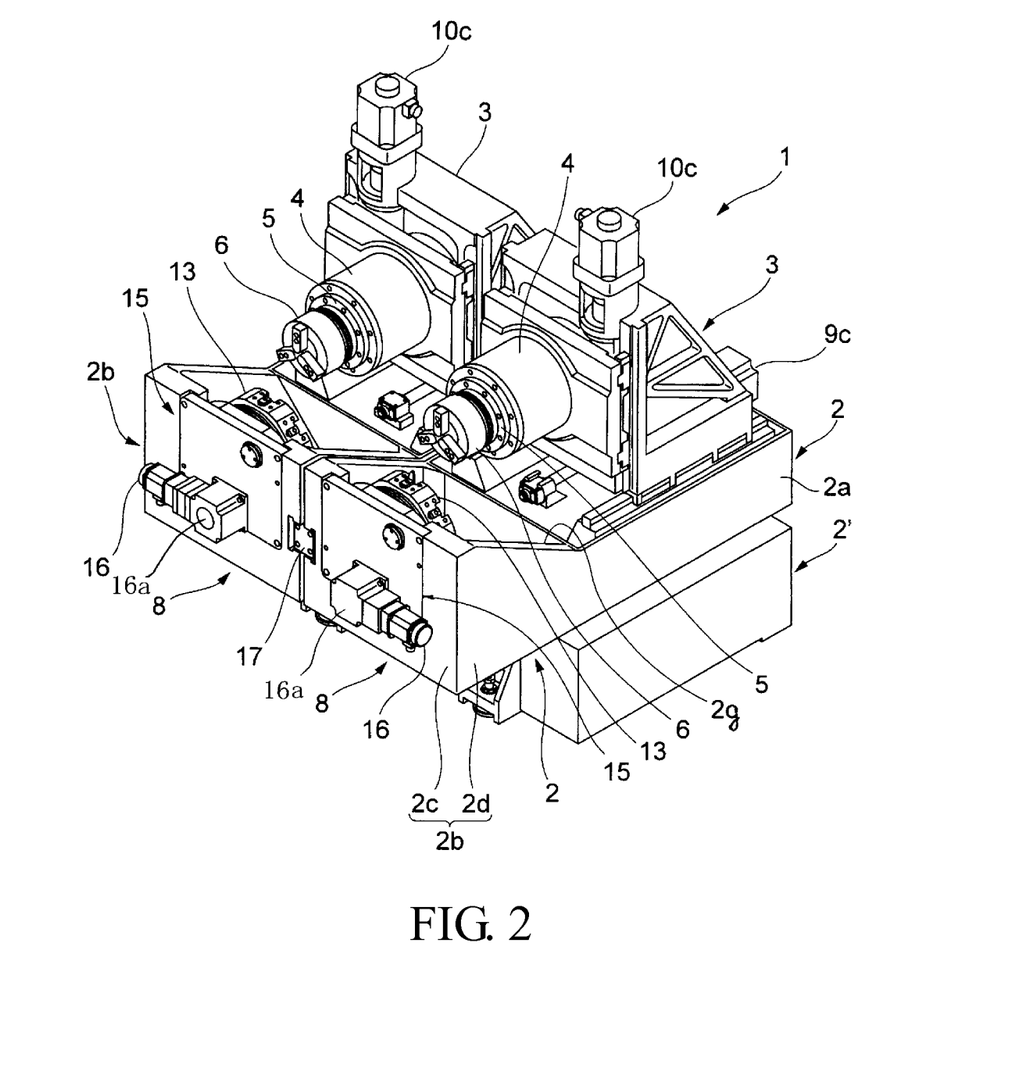
FIG. 2 is a perspective view of the lathe as seen from the front upper side of the lathe.

In the drawing, the reference symbol "1" is a type of lathe having spindles facing the operator M side. As best shown in FIG. 2, the lathe 1 is equipped with a pair of left and right beds 2 and 2, columns 3 and 3 arranged on base sections 2a and 2a of the beds 2 and 2 movably in the front and back direction (Z-axis direction as indicated in FIG. 1), spindle heads 4 and 4 movably supported on the front face of each column 3 in the up and down direction (Y-axis direction as indicated in FIG. 1), and tool mounts 8 and 8 arranged on the operator M side. The pair of beds 2 and 2 is mounted on a common bed 2'.

Each column 3 is movably mounted on guide rails 9a and 9a fixed on the base section 2a via sliders 9b and 9b so as to be movable in the Z-axis direction by driving a ball screw, which is not illustrated, with a Z-axis feeding motor 9c.

Similarly, each of the spindle heads 4 is movably supported by guide rails 10a and 10a fixed to the front face of the column 3 via sliders 10b and 10b (see FIG. 1) so as to be movable in the Y-axis direction by driving a ball screw, which is not illustrated, with a Y-axis feeding motor 10c (see FIG. 2).

A spindle 5 is arranged in each spindle head 4 to be freely rotatable about a horizontal axis, and a chuck (workpiece gripping portion) 6 configured to grip a workpiece W is mounted facing toward the operator M side at the tip section protruding from the spindle head 4 of the spindle 5. Further, as shown in FIG. 1, the reference symbol "11" denotes a workpiece import and export mechanism. This mechanism is configured to supply an unprocessed workpiece W to the chuck 6 of the spindle 5 on the left side, supply the processed workpiece by removing from the chuck 6 to the chuck 6 of the spindle 5 on the right side, and then carry the workpiece W from the chuck 6 outside the machine 1.

Each of the aforementioned beds 2 is equipped with a tool mount installation portion 2b protruded from the base section 2a to the operator M side in an overhung manner, and the left and right tool mount installation portions 2b and 2b are joined via a connection bracket 17.

Each of the aforementioned tool mount installation portions 2b is equipped with a vertical wall 2c vertically arranged in an open space below the spindle 5 and on the operator M side, and left and right side walls 2d and 2d for connecting the vertical wall 2c and the front end portion of the base section 2a. The tool mount installation portion 2b has a rectangular shape in a planar view and the rectangular shape section constitutes a chip collecting section 2g. The chip collecting section 2g has an upper opening and a lower opening. Within the chip collecting section 2g, a chip collecting shooter 7 for guiding chips generated by subjecting the workpiece W to turning processing to a chip accommodation box 12 positioned below is arranged.

Figure 3:
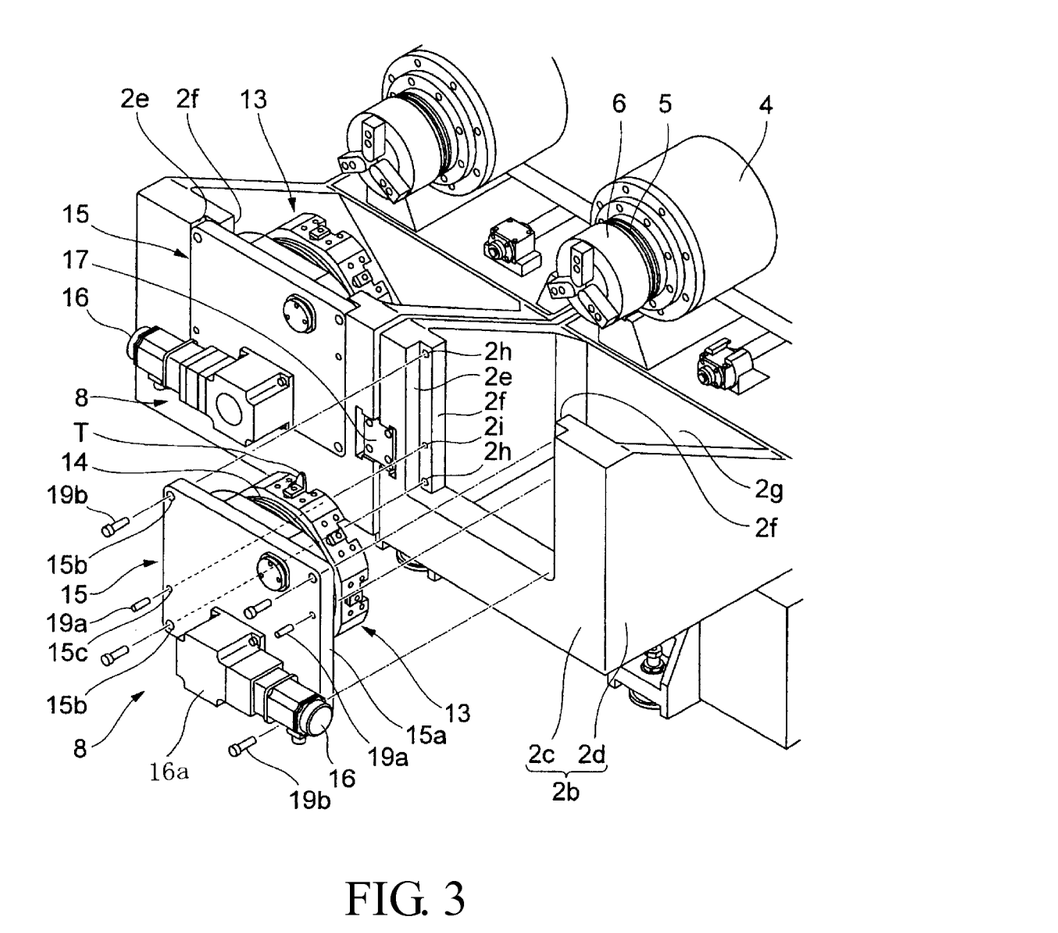
FIG. 3 is an exploded perspective view for explaining the assembly operation of the tool mount to the tool mount installation portion in the aforementioned lathe.

As shown in FIG. 3, a concave portion 2e for attaching the tool mount 8 in a removable manner is formed on the vertical wall 2c of the tool mount installation portion 2b. The concave portion 2e is open upward, and on the vertical side sections, left and right supporting flange parts 2f and 2f are formed so as to form an elongated projection protruded inward. Further, screw holes 2h and 2h and a positioning hole 2i are formed in each supporting flange part 2f.

The tool mount 8 is provided with a disc-shaped turret (rotary member) 13 equipped with a plurality of edged tools T on the outer peripheral surface thereof, an indexing mechanism 14 supporting the turret 13 about an axis parallel to an axis of the spindle 5 in an indexable manner, a supporting plate 15 for supporting the indexing mechanism 14, and an indexing motor 16 for rotatably driving the indexing mechanism 14.

The indexing motor 16 is mounted on the operator side of the supporting plate 15 such that the rotation axis of the indexing motor 16 is arranged along the outer surface of the supporting plate 15. Also, the output shaft of the indexing motor 16 is converted by a worm mechanism 16a connected to the output shaft so as to be parallel to the axis of rotation of the turret 13, and is connected to the indexing mechanism 14 arranged on the turret 13 side of the supporting plate 15.

The supporting plate 15 has a rectangular shape and is equipped with rectangular attaching flange parts 15a and 15a engaged with the concave portions 2e and 2e. At the portions of the attaching flange part 15a corresponding to the screw holes 2h and 2h and the positioning hole 2i on the concave portion 2e side, bolt holes 15b and 15b and a positioning hole 15c are formed in a penetrated manner.

The tool mount 8 is fixed to the vertical wall 2c of the tool mount installation portion 2b by bolts 19b and 19b in a state in which positioning pins 19a and 19a press-fitted in the positioning holes 2i and 2i in advance are fitted into the positioning holes 15c and 15c.

Figure 4:
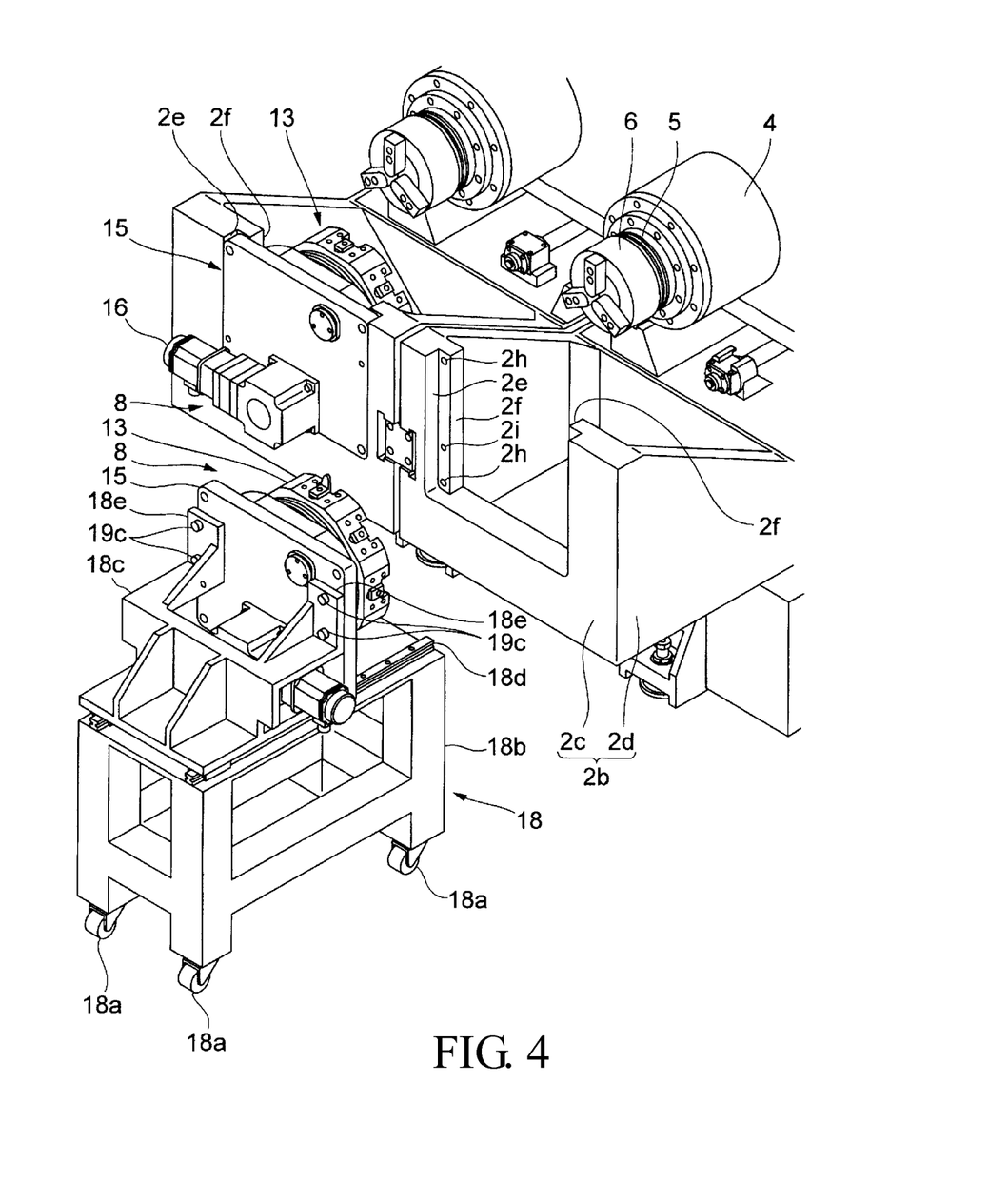
FIG. 4 is an exploded perspective view of the assembly operation of the tool mount to the tool mount installation portion in the aforementioned lathe in a case in which a carrier is used.

The exchange operation of the tool mount 8 is performed using a tool mount exchanging carriage 18 shown in FIG. 4. The carriage 18 is formed into a rectangular parallelepiped shape and equipped with a frame 18b having rollers 18a at the four bottom end corners and a jig 18c mounted on the frame 18b. The jig 18c is mounted on the frame 18b in a slidable manner in the front and back direction by guide rails 18d and 18d fixed on the top face of the frame 18b.

When removing the tool mount 8 from the tool mount installation portion 2b, the carriage 18 is moved to the front of the tool mount 8. Then, the supporting section 18e of the jig 18c is brought into contact with the supporting plate 15 of the tool mount 8. In this state, the supporting section 18e is fastened and fixed to the supporting plate 15 by bolts 19c. Next, the bolts 19b and 19b fixing the supporting plate 15 are unscrewed and the jig 18c is retreated as it is. Thus, the tool mount 8 is detached from the vertical wall 2c.

On the other hand, when attaching the tool mount 8 to the vertical wall 2c of the tool mount installation portion 2b, the carriage 18 is moved to the front of the tool mount installation portion 2b in a state in which the tool mount 8 is fixed to the jig 18c. Then, the jig 18c is slid to the concave portion 2e side, and while the positioning pins 19a and 19a implanted to the attaching flange parts 2f and 2f are aligned with the positioning holes 15c and 15c of the supporting plate 15, the supporting plate 15 is engaged with the concave portions 2e and 2e of the vertical wall 2c. Next, by screwing the bolts 19b and 19b into the screw holes 2h and 2h of the attaching flange parts 2f and 2f from the bolt holes 15b and 15b of the supporting plate 15, the supporting plate 15, or the tool mount 8, is fixed to the tool mount installation portion 2b.

According to this embodiment, since the tool mount 8 is arranged on the vertical wall 2c of the tool mount installation portion 2b positioned on the operator M side such that the turret 13, or the edged tool T, faces toward the chuck 6 side of the spindle 5, the spindle 5 and the tool mount 8 can be arranged without deviating in the left and right direction. As a result, dimensions of the machine in the left and right direction can be made compact.

Further, since the tool mount 8 is arranged using an open space below the spindle 5 and closer to the operator M side such that the axis of the tool mount 8 is positioned below the axis of the spindle 5, the dimension of the machine in the up and down direction can be made compact.

Further, since the tool mount 8 is arranged on the operator M side such that the axis of the tool mount 8 is positioned lower than the axis of the spindle 5, when removing or attaching the tool mount 8 from or to the tool mount installation portion 2b for repair, exchange, etc., of the tool mount 8, the tool mount 8 unlikely interferes with the spindle 5, and therefore the exchanging operation of the tool mount 8 can be performed easily.

Further, since the tool mount 8 is positioned closer to the operator M, the so-called accessibility to the tool mount 8 is excellent, and the exchanging operation, etc., of the edged tool T mounted on the turret 13 is easy. In this case, since the indexing motor 16 is arranged along the outer surface of the supporting plate 15, the protruding amount of the indexing motor 16 can be made small, and the worsening of the accessibility due to arranging the indexing motor 16 to the operator side can be kept minimal.

Further, by employing a tool mount exchanging carriage 18, the tool mount 8 can be easily moved to an attachment position and conversely detached to the outside without requiring a crane equipment.

Further, in this embodiment, the tool mount 8 is arranged such that the axis of the turret 13 is positioned below the axis of the spindle 5, the tool mount supporting stiffness of the tool mount installation portion 2*b* can be easily secured.

Further, in this embodiment, since the concave portion 2*e* to which the tool mount 8 can be inserted from the operator M side is formed in the tool mount installation portion 2*b* provided on the operator M side, when attaching the tool mount 8 to the tool mount installation portion 2*b*, it is only required to insert the tool mount 8 into the concave portion 2*e* of the tool mount installation portion 2*b* in a horizontal direction in a state in which the tool mount 8 is mounted on the carriage 18, and fastening and fixing by bolts 19*b*, etc., which easily can execute the exchanging operation of the tool mount 8.

Embodiment 2

Figure 6:
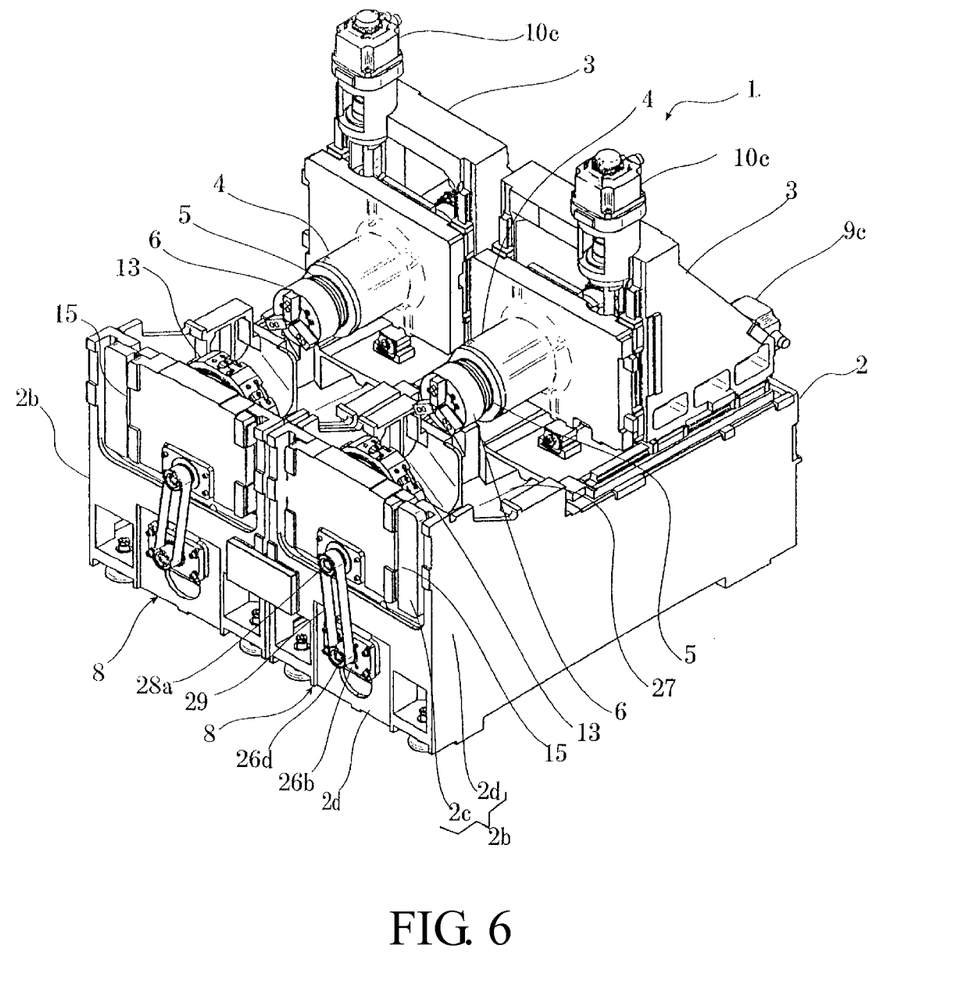
FIG. 6 is a perspective view of a lathe as seen from the front upper side of the lathe according to Embodiment 2 of the present invention.
Figure 7:
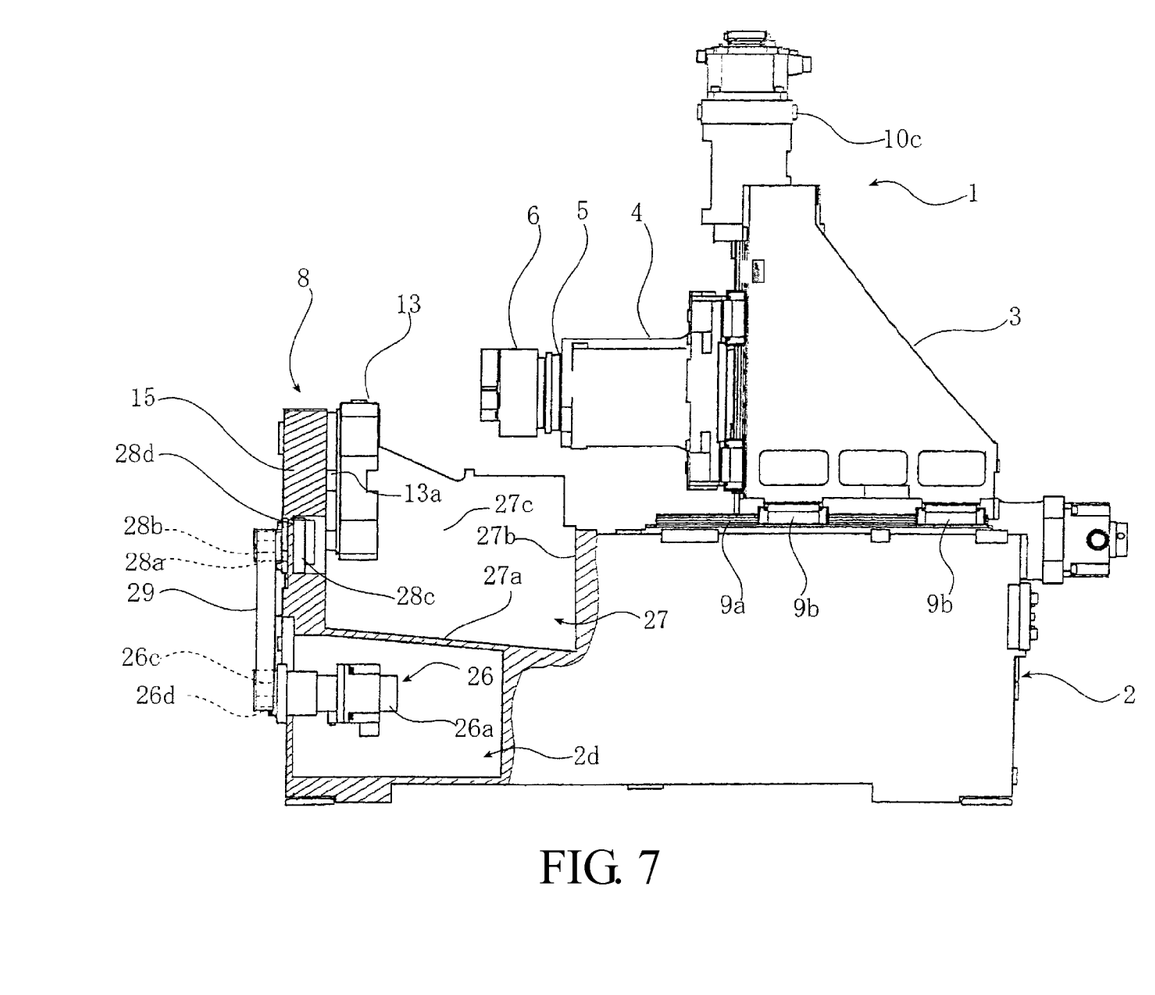
FIG. 7 is a partially cross-sectioned side view of the lathe according to Embodiment 2.
Figure 8:
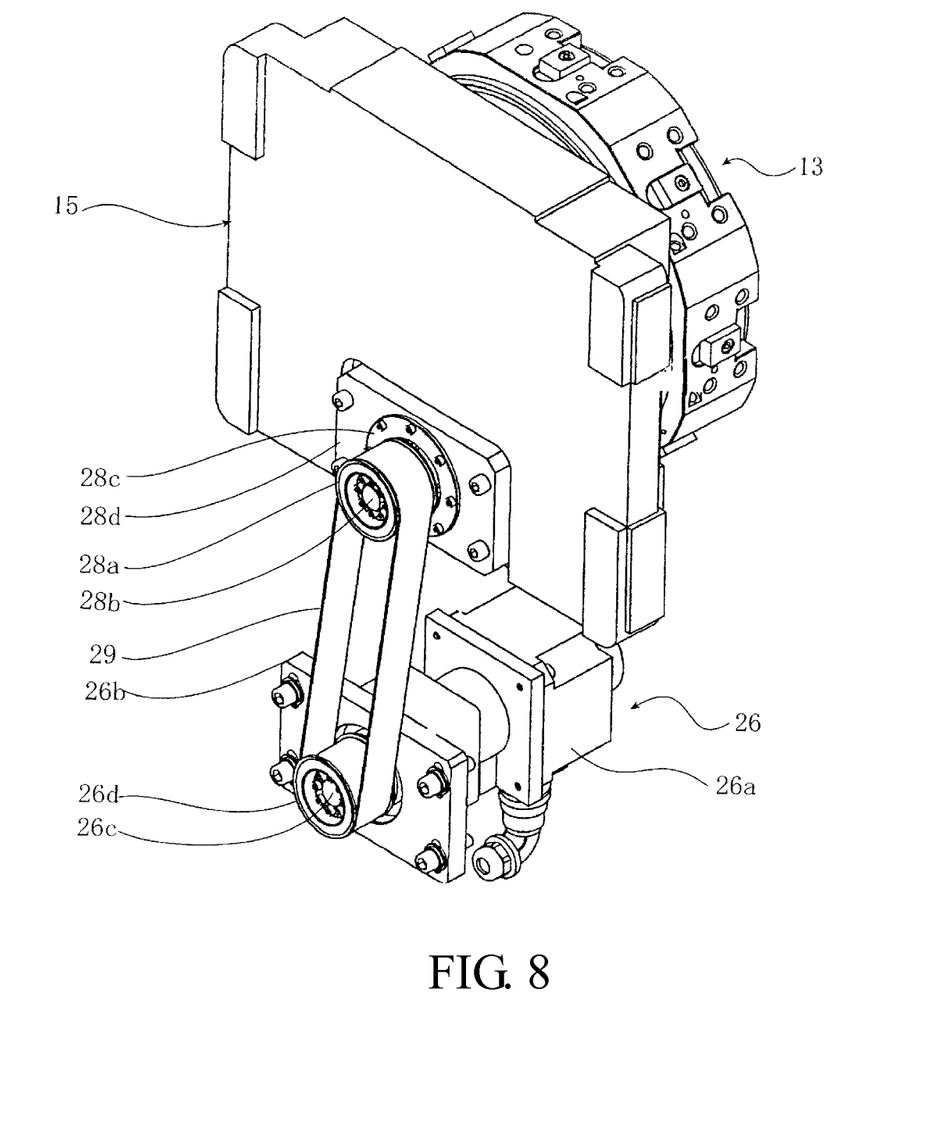
FIG. 8 is a perspective view of the tool mount portion of the lathe as seen from the front upper side of the lathe according to Embodiment 2.

FIGS. 6 to 8 are drawings for explaining a lathe according to Embodiment 2 of the present invention. In the drawing, the same symbol as that in FIGS. 1 to 4 denotes the same or corresponding part.

In Embodiment 2, an indexing motor 26 is arranged below a chip accommodation section 27. The chip accommodation section 27 has a rectangular shape in a planar view surrounded by a bottom wall 27*a*, a rear side vertical wall 27*b*, vertical walls 27*c* and 27*c* on left and right sides, and a supporting plate 15, and is formed to extend from the below of the spindle 5 to the below of the turret 13.

The indexing motor 26 is set so that the main body section 26*a* is accommodated inside the motor accommodation section 2*d* formed below the bottom wall 27*a* of the chip accommodation section 27. Further, the flange part 26*b* is fastened and fixed by bolts to the attachment wall 2*e* of the motor accommodation section 2*d*.

A drive pulley 26*d* having meshing teeth is fixed to an output shaft 26*c* protruding from the flange part 26*b* of the indexing motor 26. Above the drive pulley 26*d*, an intermediate shaft 28*b* equipped with a driven pulley 28*a* having meshing teeth, likewise, is arranged. The driven pulley 28*a* and the drive pulley 26*d* are joined by a toothed timing belt 29.

The flange part 28*d* of a supporting box 28*c* rotatably supporting the intermediate shaft 28*b* is fastened and fixed to the supporting plate 15 by bolts. Further, the intermediate shaft 28*b* is joined to a rotary shaft 13*a* of the turret 13 via an indexing mechanism which is not illustrated.

In Embodiment 2, since the indexing motor 26 is arranged below the chip accommodation section 27, that is, more to the processing region side than the supporting plate 15 of the tool mount installation portion 2*b*, the protrusion of the indexing motor 26 from the supporting plate 15 to the operator M side can be controlled to be about the length of the drive pulley 26*d* and the driven pulley 28*a*, which in turn makes the operator's M accessibility to the tool mount 8 even better and makes it easier to perform the exchanging operation, etc., of the edged tool T.

Further, since the indexing motor 26 is covered by the chip accommodation section 27 from above, although the indexing motor 26 is arranged within the processing region, it can prevent chips, cutting fluid, etc., from falling onto the motor without providing a dedicated cover.

Figure 5:
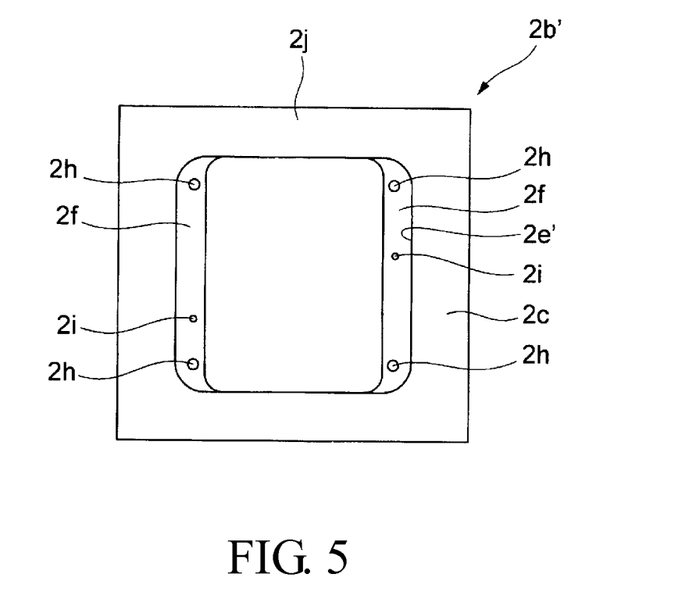
FIG. 5 is a schematic front view showing a modified embodiment of the tool mount installation portion of the lathe.

Further, in Embodiments 1 and 2, although a case in which the vertical wall 2*c* of the tool mount installation portion 2*b* has concave portions 2*e* upwardly opened was explained, as shown in FIG. 5, the tool mount installation portion 2*b* of the present invention can have a surrounding section 2*e*' in which the upper edge sections of the concave portions 2*e* and 2*e* are joined by a beam section 2*j*.

In this way, in a case in which the surrounding section 2*e*' is provided, similar functional effects as Embodiment 1 can be obtained, which in turn further makes it possible to improve the supporting stiffness of the tool mount of the tool mount installation portion 2*b*', contributing to the improvement of the processing accuracy.

Further, in Embodiments 1 and 2, a lathe 1 equipped with two sets of left and right spindles 5 and tool mounts 8 was explained, but the machine tool of the present invention can be equipped with one set or three sets or more of the spindles 5 and the tool mounts 8.

The terms and descriptions used herein are used only for explanatory purposes and the present invention is not limited to them. Accordingly, the present invention allows various design-changes falling within the claimed scope of the present invention.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." In this disclosure and during the prosecution of this application, the terminology "present invention" or "invention" is meant as a non-specific, general reference and may be used as a reference to one or more aspects within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features.

What is claimed is:

1. A machine tool comprising:
a bed;
a column being configured on the bed, and including a vertical surface facing an operator;
a spindle being supported on the vertical surface and having an axis being horizontally arranged, the axis extending in a first direction;
a workpiece gripping portion configured on the spindle at an operator side thereof, the spindle being configured to rotatably drive a workpiece gripped by the workpiece gripping portion;
a tool mount installation portion being configured on the bed and on the operator side;
a tool mount being sustained by the tool mount installation portion;
a rotary member being configured on the tool mount, being arranged to face the workpiece gripping portion, and supporting a plurality of tools in a rotatably indexable manner about an axis parallel to an axis of the spindle; and
an operating unit configured on the operator side for the operator to operate,
the tool mount is arranged between the operating unit and the workpiece gripping portion in the first direction,
the rotary member being arranged to face the workpiece gripping portion.

2. The machine tool as recited in claim 1, wherein the tool mount is arranged so that an axis of the rotary member is positioned below the axis of the spindle.

3. The machine tool as recited in claim 1, further comprising an indexing motor configured to index the rotary member to a desired angular position,
wherein the indexing motor is arranged below a chip accommodation section for accommodating chips generated by machining the workpiece, and
wherein an output shaft of the indexing motor is connected to a rotary shaft of the rotary member via a power transmission mechanism.

4. The machine tool as recited in claim 1, further comprising
the spindle is movable in the first direction towards the tool mount.

5. The machine tool as recited in claim 1, wherein
the spindle is movable in the first direction towards the tool mount, and
a selected tool from the plurality of tools for machining the workpiece is viewable in the first direction from the front.

* * * * *